UNITED STATES PATENT OFFICE.

BENJAMIN J. CHRISTIE, OF DENVER, COLORADO, ASSIGNOR OF ONE-HALF TO EDMUND BECKER, OF DENVER, COLORADO.

COMPOSITION FOR COVERING STEAM-PIPES, &c.

1,161,289.  Specification of Letters Patent.  Patented Nov. 23, 1915.

No Drawing.  Application filed January 2, 1914.  Serial No. 809,969.

*To all whom it may concern:*

Be it known that I, BENJAMIN J. CHRISTIE, a citizen of the United States, residing in the city and county of Denver and State of Colorado, have invented a certain new and useful Composition for Covering Steam-Pipes, &c.; and I do declare the following to be a full, clear, and exact description of the invention, such as will enable others skilled in the art to which it appertains to make and use the same.

My invention relates to a composition of matter to be used for covering steam pipes, boilers, T-joints, elbows, valves, domes of boilers and other vessels for generating, holding and carrying steam, and also for holding and carrying hot water, as in hot water heating systems, to prevent the escape or waste of heat, which composition consists of flax-straw, fire-clay, water and a liquid binder composed of rusty water, vinegar, borax, glue and linseed oil.

The flax-straw forms the body of the composition and is originally mixed with the fire-clay and water to form a mortar of proper consistency, after which the liquid composed of the rusty water, vinegar, borax, glue and linseed oil is added, to properly bind the elements of the mortar together to form the pipe covering.

The liquid binder may be formed from the ingredients above stated, by using the following proportions: Rusty water, six pints, vinegar two pints, borax four ounces, glue one ounce, linseed oil one-half pint. These proportions may be varied somewhat without departing from the spirit of the invention. The several ingredients are first mixed together to form a gallon, approximately, of the liquid binder. This is then boiled for half an hour, whereby a perfectly homogeneous compound is produced.

The flax-straw, fire-clay and water to form the covering may be mixed in the following proportions: Flax-straw one-fourth pound, fire-clay four pounds, water three pints.

The flax-straw should be chopped to form pieces about one-half inch long. This composition is thoroughly mixed to the consistency of rather a heavy mortar, as above indicated, after which one-half pint of the liquid binder is added. For the first coat the composition so formed may be applied with a brush, say one-fourth of an inch in thickness. This, however, may vary, as desired.

It must be understood that the proportions of the ingredients, as above given, may be varied within reasonable limits for both coats of the covering.

The rusty water constituting one of the elements of the liquid binder may be obtained by placing the water and vinegar in a receptacle containing iron filings, or iron in any other suitable condition to facilitate obtaining the rusty condition of the water.

The water and vinegar may remain upon the iron for several days, or until the liquid is thoroughly impregnated with the rust resulting from the oxidization of the iron.

Having thus described my invention, what I claim is:

1. A composition of matter to be used as a heat insulating covering, comprising flax-straw, fire-clay, water and a liquid binder, combined approximately in the following proportions:—flax-straw one-fourth pound, fire-clay four pounds, water three pints, liquid binder one-half pint, the said binder being composed of substantially the following ingredients and proportions:—rusty water six pints, vinegar two pints, borax four ounces, glue one ounce, linseed oil one-half pint.

2. A composition of matter for use as a heat insulating covering, consisting of the following ingredients and proportions: flax-straw, one-fourth pound, fire-clay, four pounds, water, three pints, and a liquid binder, one-half pint, the latter being composed of ingredients and proportions, as follows: rusty water, six pints, vinegar, two pints, borax, four ounces, glue, one ounce, and linseed oil, one-half pint.

In testimony whereof I affix my signature in presence of two witnesses.

BENJAMIN J. CHRISTIE.

Witnesses:
A. J. O'BRIEN,
A. EBERT O'BRIEN.

Copies of this patent may be obtained for five cents each, by addressing the "Commissioner of Patents, Washington, D. C."